US010337945B2

(12) United States Patent
Blumrich

(10) Patent No.: US 10,337,945 B2
(45) Date of Patent: Jul. 2, 2019

(54) METHOD FOR DETECTING A FUEL LEAK IN A FUEL SYSTEM OF AN AIRCRAFT HAVING AT LEAST TWO ENGINES

(71) Applicant: Rolls-Royce Deutschland Ltd & Co KG, Blankenfelde-Mahlow (DE)

(72) Inventor: Markus Blumrich, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 44 days.

(21) Appl. No.: 14/962,449

(22) Filed: Dec. 8, 2015

(65) Prior Publication Data
US 2016/0178471 A1    Jun. 23, 2016

(30) Foreign Application Priority Data

Dec. 19, 2014  (DE) .................. 10 2014 119 210

(51) Int. Cl.
| | |
|---|---|
| G01M 3/00 | (2006.01) |
| G01M 3/02 | (2006.01) |
| F02C 7/236 | (2006.01) |
| F02C 9/46 | (2006.01) |
| B64D 37/00 | (2006.01) |

(52) U.S. Cl.
CPC ........... G01M 3/025 (2013.01); B64D 37/005 (2013.01); F02C 7/236 (2013.01); F02C 9/46 (2013.01); F05D 2260/80 (2013.01)

(58) Field of Classification Search
CPC ............. F02M 25/0809; G01M 3/025
See application file for complete search history.

(56) References Cited

U.S. PATENT DOCUMENTS

| | | |
|---|---|---|
| 2008/0125930 A1 | 5/2008 | Johnson |
| 2010/0288883 A1 | 11/2010 | Rivot |
| 2011/0307192 A1 | 12/2011 | Veilleux |

(Continued)

FOREIGN PATENT DOCUMENTS

| | | | | |
|---|---|---|---|---|
| JP | 5699699 B2 * | 4/2015 | ............. | F02D 41/22 |
| SU | 1049677 A1 * | 10/1983 | ............. | F02D 17/04 |
| WO | WO2014060751 A1 | 4/2014 | | |

OTHER PUBLICATIONS

Lufthansa Technical Training GmbH, Training Manual A319 / A320 / A321, Jul. 1999.*

(Continued)

*Primary Examiner* — Son T Le
*Assistant Examiner* — Herbert K Roberts
(74) *Attorney, Agent, or Firm* — Shuttleworth & Ingersoll, PLC; Timothy J. Klima

(57) ABSTRACT

A method for detecting a fuel leak in a fuel system of an aircraft having at least two engines, where both a first engine and a second engine are each assigned a tank device and each at least one sensor device connected to a control and evaluation device. By means of the at least one sensor device, values for the assigned engine are determined from a group of defined parameters. The control and evaluation device compares the values determined by the sensor devices, corresponding with one another, and detects a fuel leak of the fuel system when there is a divergence in the values of a parameter that exceeds a predetermined threshold value.

17 Claims, 4 Drawing Sheets

(56) References Cited

U.S. PATENT DOCUMENTS

Figure 1:
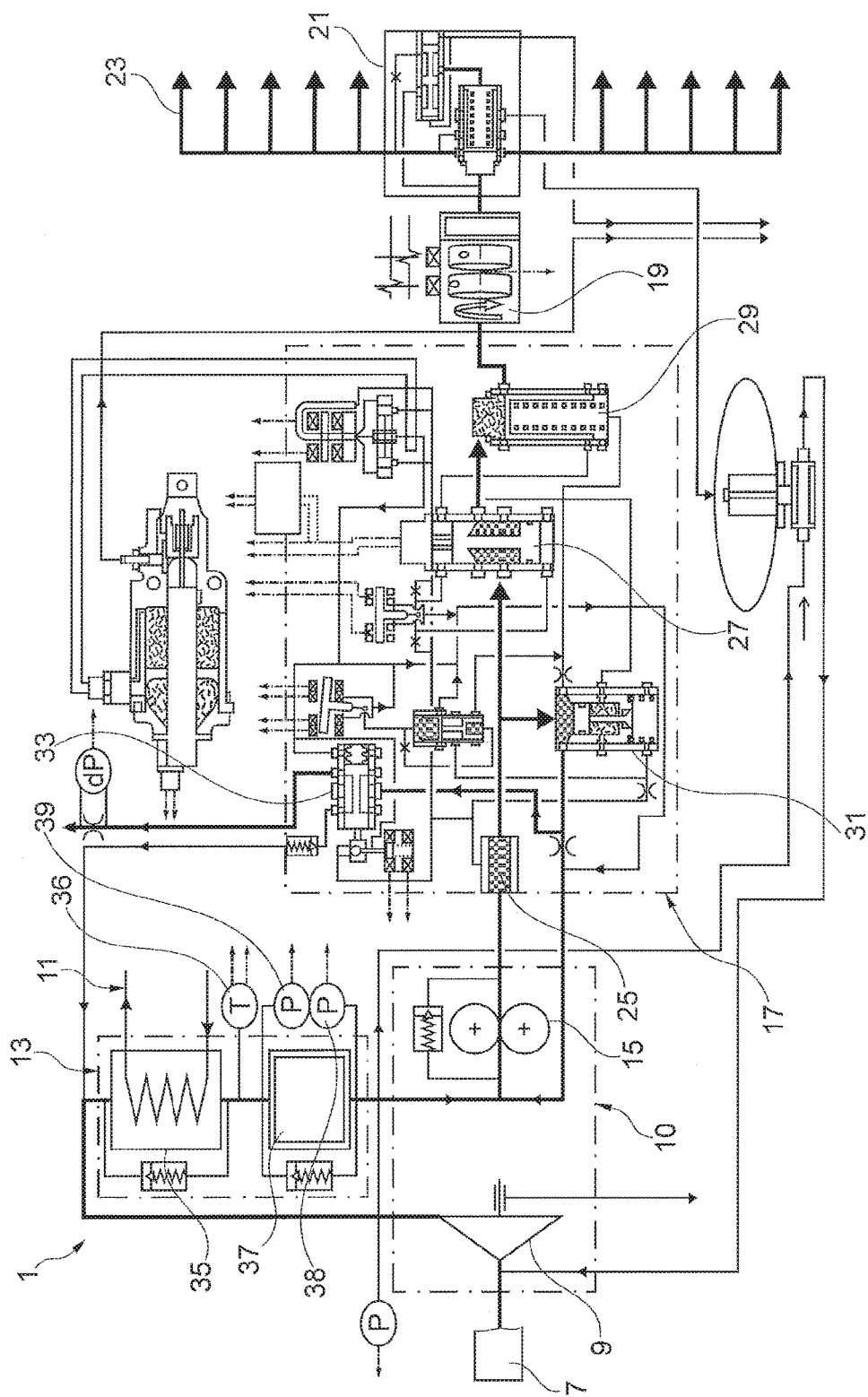

| | | | |
|---|---|---|---|
| 2012/0130617 A1* | 5/2012 | Raimarckers | F01D 21/003 |
| | | | 701/99 |
| 2013/0090831 A1* | 4/2013 | Kwon | G01H 17/00 |
| | | | 701/99 |
| 2013/0238226 A1* | 9/2013 | Slaymaker | F02D 41/065 |
| | | | 701/113 |
| 2013/0269364 A1 | 10/2013 | Romig et al. | |

OTHER PUBLICATIONS

European Search Report dated May 3, 2016 for counterpart European application No. 15197330.2.
German Search Report dated Nov. 16, 2015 from counterpart German App No. 10 2014 119 210.9.

* cited by examiner

METHOD FOR DETECTING A FUEL LEAK IN A FUEL SYSTEM OF AN AIRCRAFT HAVING AT LEAST TWO ENGINES

This application claims priority to German Patent Application 102014119210.9 filed Dec. 19, 2014, the entirety of which is incorporated by reference herein.

This invention relates to a method for detecting a fuel leak in a fuel system of an aircraft having at least two engines in accordance with the present disclosure.

Methods are known from actual practice using which fuel leaks of an aircraft designed with two engines are detected from diverging filling levels of the tank devices of the engines. A disadvantage of a method of this type is however that a leak is only detectable at a late stage, which is undesirable. If fuel is exchanged between the tank devices by a so-called "cross feed", fuel leaks cannot be detected with a method of this type.

Methods are also known from actual practice in which for detection of a fuel leak a fuel quantity supplied to the burner of the respective engine is measured and the values of the left hand engine are compared with the values of the right hand engine. A fuel leak is detected here when a divergence of the values of the one engine from the corresponding values of the other engine is greater than a predetermined limit value.

Known methods of this type have the drawback that only fuel leaks with a relatively high leakage rate can be detected and fuel leaks might be detected late or not at all.

The object underlying the present invention is to provide a method for detecting a fuel leak in a fuel system of an aircraft having at least two engines, using which fuel leaks can reliably be detected.

This object is solved by a method having the features as disclosed herein.

The method in accordance with the invention is intended for detecting a fuel leak in a fuel system of an aircraft having at least two engines, where both a first engine and a second engine are each assigned a tank device and each at least one sensor device connected to a control and evaluation device.

It is provided in accordance with the invention that by means of the at least one sensor device, values for the assigned engine are determined from the following group of parameters:
  temperature of the fuel and/or
  pressure difference between predefined points in the fuel system and/or
  temperature of the oil of an oil circuit assigned to the engine, for cooling of which the fuel is provided as a coolant, and/or
  pressure difference between predefined points in the oil circuit assigned to the engine and/or
  output of a pump device for conveying fuel of the fuel system to a burner of the engine,
wherein the control and evaluation device compares the values determined by the sensor devices, corresponding with one another, and detects a fuel leak of the fuel system when there is a divergence in the values of a parameter that exceeds a predetermined threshold value.

Extensive tests have proven that with the method in accordance with the invention, fuel leaks are detected more reliably than with known methods, where in particular smaller fuel leaks are already detected in the respective engines of the aircraft at leakage rates of up to 350 pounds per hour (pph) when idling, of up to 600 pph when cruising and of up to 1,200 pph when climbing. The method in accordance with the invention is advantageously easy to integrate into existing systems, in particular when corresponding sensor devices for determining a parameter are already present. In this case, only a new software performing the method in accordance with the invention has to be implemented. With the method in accordance with the invention, detection of fuel leaks is advantageously possible in real time.

The method in accordance with the invention is based on the knowledge that in the event of a fuel leak in the fuel system, a fuel quantity conveyed inside the fuel system in the direction of the burner of the engine rises, and as a result the temperature of the fuel changes and in particular falls. A fuel supply increased in this way can thus be determined by comparing the temperature values of the fuel in the two engines.

In an analogous manner, a fuel leak can be detected by the detection of a pressure difference between predefined points in the fuel system, since a pressure change occurs due to a leakage-related increase in the fuel conveying quantity in various areas of the fuel system.

An increased fuel flow in the fuel system can also be determined by the interaction of the oil with the fuel system in the area of a cooling device based on the temperature of the oil in an oil circuit assigned to the engine, since changed cooling properties result in the area of the cooling device as the oil changes its temperature.

Since also the viscosity of the oil changes where there is a temperature change of the oil in the oil circuit, a fuel leak can also be detected by pressure sensors that measure a pressure change between predefined points in the oil circuit.

With a changed conveying quantity of fuel in the fuel system due to a leak, the output properties of the pump device for conveying fuel of the fuel system to the burner of the engine also change. Hence, a fuel leak can also be detected in simple manner by a comparison of correlating output properties of the pump devices of the two engines.

To reduce occurrences of erroneous fuel leak detection, an advantageous embodiment of the method in accordance with the invention provides that the control and evaluation device for detecting a fuel leak compares the values of the engines in at least two of the parameters, and detects a fuel leak when a divergence in the respective values of the two engines is greater than a predetermined threshold value in each case. The more parameters of the two engines are compared, the more reliably erroneous leakage detections can be prevented.

In a development of the method in accordance with the invention, the control and evaluation device detects a fuel leak only when the divergence in the values of at least one parameter is greater, preferably continuously over a predefined period, than the predetermined threshold value stored in particular in the control and evaluation device. An unwelcome erroneous leakage detection can also be avoided in a simple manner by providing a period of this type which can for example be about 30 seconds.

In an advantageous embodiment of the method in accordance with the invention, the threshold value for a temperature difference preferably stored in the control and evaluation device can be greater than 10° C., in particular between 15° C. and 30° C., when comparing the temperature values in the fuel of the two engines. In tests, a threshold value corresponding to a temperature difference of about 17° C. has proven particularly advantageous here.

In a comparison of the temperature values of the oil of the two engines, the threshold value stored in the control and evaluation device can correspond to a temperature difference greater than 10° C., in particular between 15° C. and 30° C.

In tests, a correlation of the oil temperature in the oil circuit with the temperature of the fuel in the fuel system was determined such that a fuel leak is detected in a particularly error-resistant manner if the threshold value corresponds to a temperature difference of approx. 15° C.

It can furthermore be provided in an advantageous development of the method in accordance with the invention that the control and evaluation device detects a fuel leak only when a constant operating state of the two engines is detected. In particular when the high-pressure shaft speeds of both engines differ from one another for a period of for example about 10 minutes by less than in particular 2%, and the high-pressure shaft speeds of both engines are greater than for example 55% of the maximum speed of the high-pressure shafts, it is easy to prevent that dynamic processes during the flight or divergences in the compared values during take-off of the aircraft are leading to an erroneous detection of a fuel leak. A constant operating state of the engines can also be detected if both engines are in thrust operation for example over a predetermined period.

The same purpose is served by a further version of the method in accordance with the invention, in which the control and evaluation device detects a fuel leak only when a return of fuel into the tank device is detected as being at least approximately equal in both engines, since the return of fuel into the tank device has a major effect on the temperatures of the fuel system and of the oil circuit. This rules out that a fuel leak is detected when for example fuel is returned for the purpose of increasing a fuel temperature to the respective tank device in one engine, and not in the other engine.

Alternatively or additionally to this, it can be provided that the control and evaluation device detects a fuel leak only when a return of fuel into the respective tank device in both engines is determined to be error-free, since in this case it is not ensured that the return of fuel into the respective tank device is comparable for both engines. With a state, determined in both engines as comparable, where fuel is returned into the respective tank device, it is possible with the method in accordance with the invention to detect for example fuel leakage rates of approx. 2,500 pph when the engines are idling and of approx. 3,100 pph when the engines are at cruising speed.

Erroneous fuel leak detection by the control and evaluation device can also be prevented when a temperature in the tank device of the first engine diverges from a temperature in the tank device of the second engine by less than 20° C., in particular by less than 10° C.

In an advantageous development of a method in accordance with the invention, it is provided that the control and evaluation device detects a fuel leak only when no error message is detected from a sensor device whose values are used to detect a fuel leak. In this way too, it can be prevented in simple manner that a fuel leak detection is erroneous.

To prevent an erroneous fuel leak detection in extreme boundary conditions, for example failure of a bearing device, it can be provided that the control and evaluation device detects a fuel leak only when values determined by the sensor device for a temperature of the oil in the oil circuit for both engines are lower than a predefined limit value and/or when vibrations of an engine are lower than a predefined limit value.

To achieve a particularly reliable fuel leak detection, the respective sensor device can determine the temperature of the fuel in the engine in the area of a cooling device intended for cooling the oil, and/or the respective sensor device can determine the pressure difference in the fuel system of the engine from a pressure prevailing upstream of a filter device and from a pressure prevailing downstream of the filter device, said filter device being assigned in particular to a cooling device intended for cooling the oil, and/or the respective sensor device can determine the temperature of the oil in the oil circuit assigned to the engine in a line area in which oil is passed directly back to an oil tank device, and/or the respective sensor device can determine the pressure difference in the oil circuit of the engine from a pressure in an oil return line and from a pressure in a line via which oil is supplied to a consumer.

Both the features stated in the patent Claims and the features stated in the following exemplary embodiment of the method in accordance with the invention are each suitable, singly or in any combination with one another, to develop the subject matter of the invention.

Further advantages and advantageous embodiments of the method in accordance with the invention become apparent from the patent Claims and the exemplary embodiments described in principle in the following with reference to the accompanying drawing, wherein the same reference numerals are used for components of comparable design and function for greater clarity.

Figure 2:
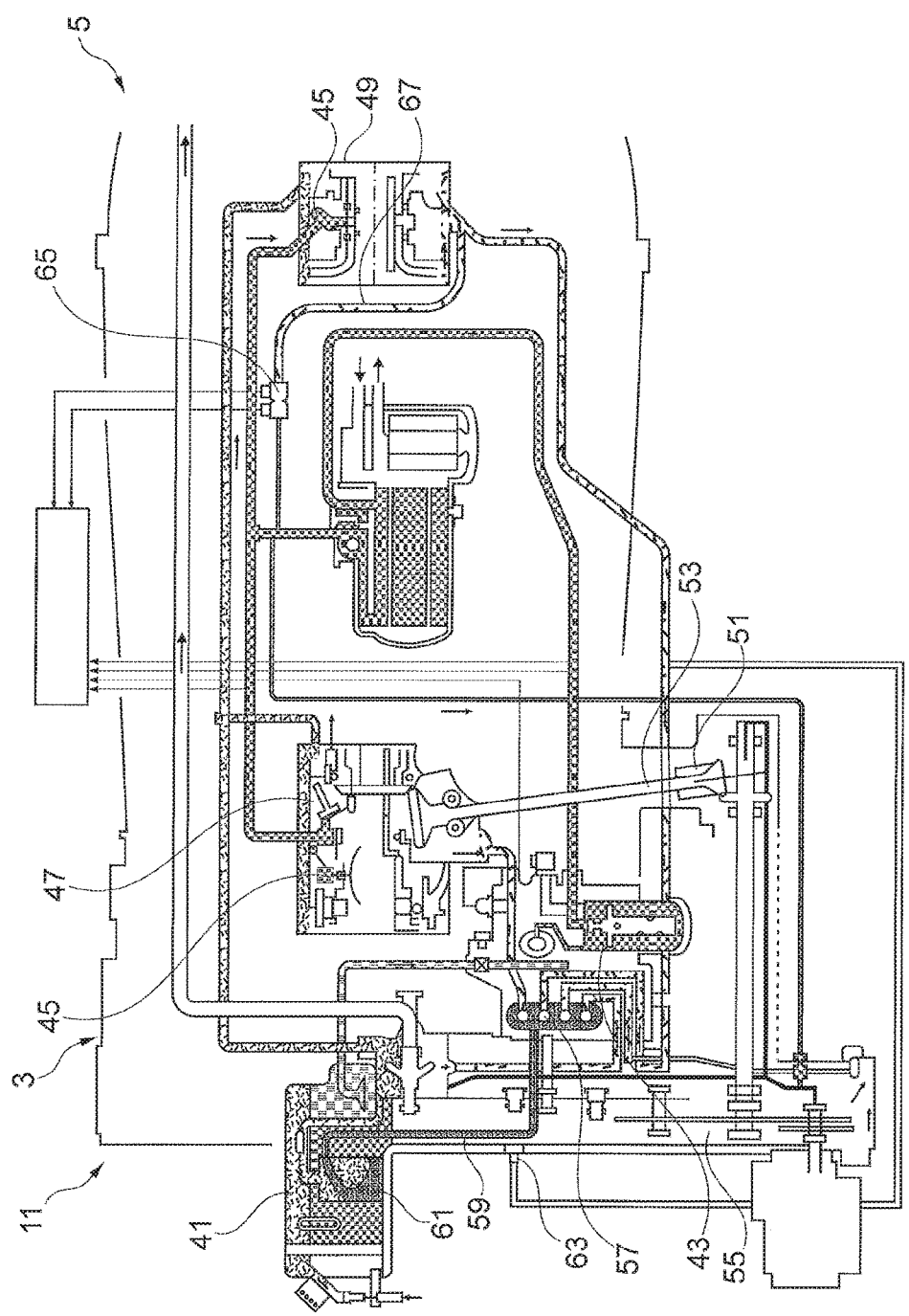
Figure 3:
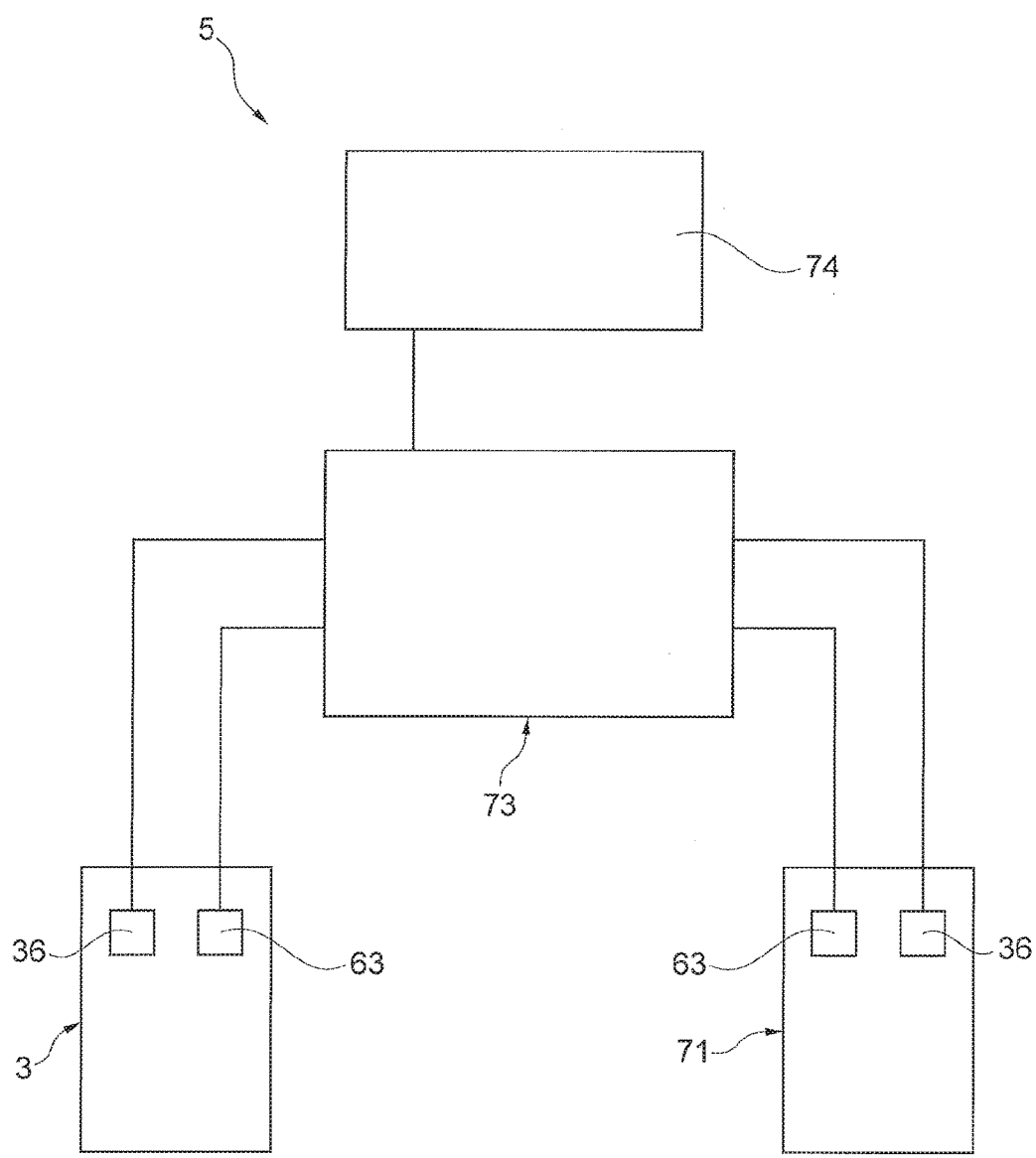
Figure 4:
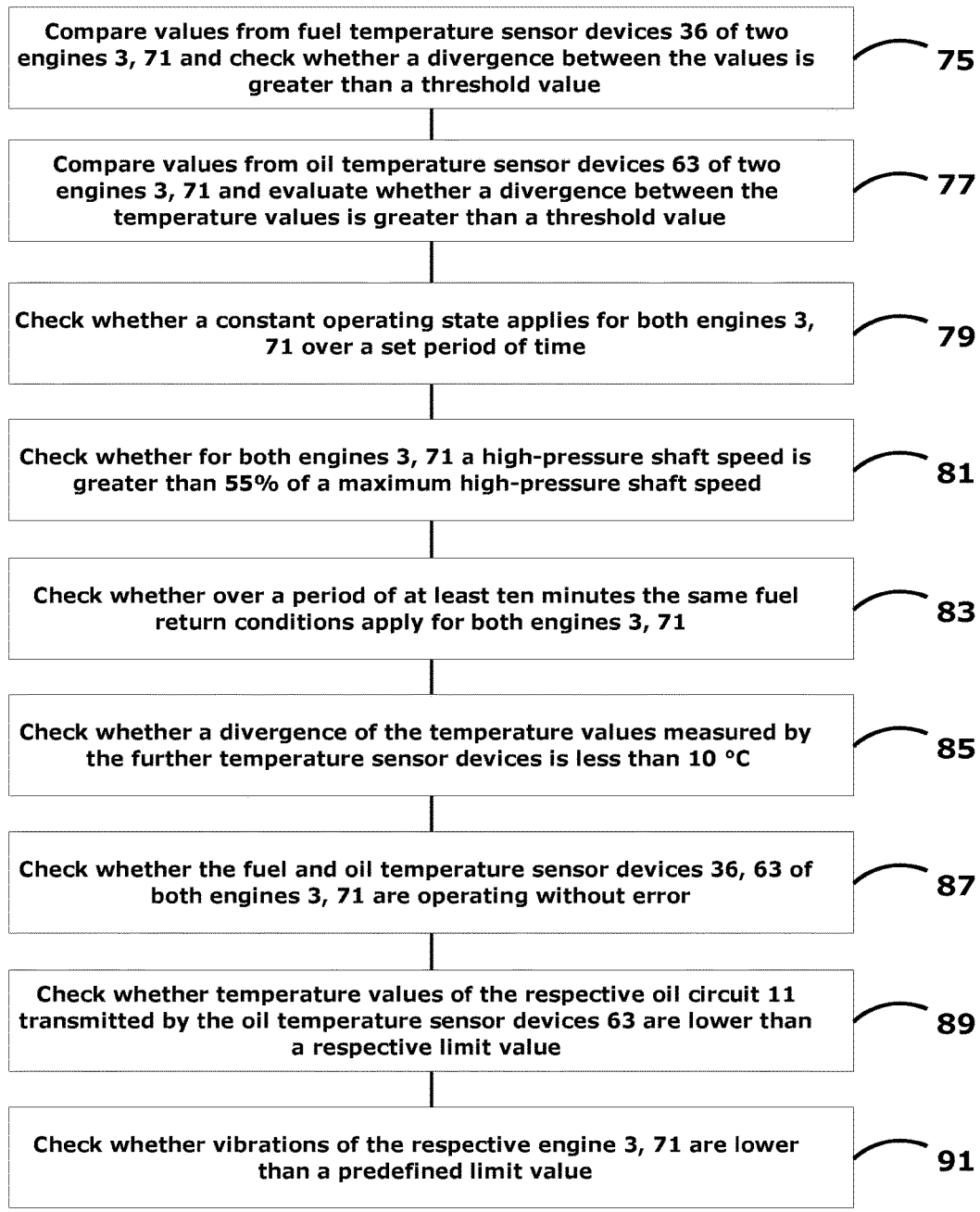

In the drawing,

FIG. 1 shows a simplified illustration of a fuel system of an aircraft engine, FIG. 2 shows a simplified illustration of an oil circuit of the engine that interacts in the area of the cooling device with the fuel system of FIG. 1, FIG. 3 shows a highly schematized view of an aircraft designed with two engines, where a control and evaluation device can be seen in more detail, and FIG. 4 shows a flow chart of a method in accordance with the present invention represented in simplified form.

FIG. 1 shows a fuel system 1 of an aircraft/jet engine 3 of an aircraft 5. The fuel system 1 has a tank device 7, from which fuel is supplied to a high-pressure pump 15 of a pump device 10 via a low-pressure pump 9 of the pump device 10 and a cooling device 13 designed for cooling oil in an oil circuit 11, shown in more detail in FIG. 2. Starting from the high-pressure pump 15, fuel is supplied via a fuel metering device 17 (fuel metering unit) and a flow measuring device 19 to a distributing unit 21, a so-called overspeed and splitter unit, in the area of which the fuel is distributed evenly between upper and lower injection lines and finally supplied to different fuel injection nozzles 23.

In the area of the fuel metering device 17, the fuel is passed downstream of the high-pressure pump 15 via a filter device 25 to a fuel metering valve device 27, in the area of which a volume flow can be set. Downstream of this, the fuel is supplied via a further valve device 29, a so-called pressure shutoff valve, to the flow measuring device 19. Besides the fuel metering device 27, fuel is also supplied downstream of the filter device 25 to an additional valve device 31, a so-called pressure drop control and spill valve, downstream of which fuel is passed on the one hand back to the engine pump device 10 and on the other hand to a valve device 33, a so-called fuel-return-to-tank valve. Fuel can be passed back into the tank device 7 via the valve device 33.

A cooler 35 and downstream thereof a filter 37 are arranged in the area of the cooling device 13. Downstream of the cooler 35 and upstream of the filter 37, a temperature sensor device 36 is arranged, by means of which values of a fuel temperature can be determined. Also, two pressure sensor devices 38, 39 are arranged in the area of the cooling device 13, wherein one pressure sensor device 38 is arranged downstream of the filter 37 and one pressure sensor device 39 upstream of the filter 37, such that a differential pressure can be determined by a comparison of the values of the two pressure sensor devices 38 and 39.

FIG. 2 shows the oil circuit 11 in more detail, where oil coming from a tank 41 can be supplied by means of a pump device 43 to the cooling device 13, in the area of which the oil of the oil circuit 11 is temperature-controlled using fuel of the fuel system 1. Downstream of the cooling device 13, oil is supplied to consumers, in particular bearing devices 45 for mounting engine shafts in the area of bearing chambers 47, 49 of the engine 3, or bearing devices 51 for mounting a drive shaft 53 of an accessory gearbox 55. From the bearing chambers 47, 49 and the accessory gearbox 55, the oil is finally passed via several scavenge pumps 57 and via a single line 59 back to the tank 41. Furthermore, the tank 41 is supplied with oil that is drawn by an oil separator 61, in this case arranged in the area of the tank 41, from an air-oil mixture generated in the area of the consumers.

The line 59 is assigned a temperature sensor device 63 which measures a temperature of the oil in the line 59. The oil circuit 11 furthermore has a pressure sensor device 65 by which a differential pressure is determined between a pressure of the oil downstream of the cooling device 13 and a pressure in a scavenge line 67 for oil from a consumer to the tank 41.

FIG. 3 shows the aircraft 5 in greatly simplified form and designed in this case with two engines 3, 71, said engines 3, 71 being designed substantially comparable, and hence, relating to engine 71 reference is made to the explanations regarding engine 3. Each engine 3, 71 is designed here with a temperature sensor device 36 and a temperature sensor device 63. A control and evaluation device 73 is also shown in simplified form, which is in operative connection with the sensor devices 36 and 63 of the two engines 3, 71 and can for example include a memory device and a processor. The control and evaluation device 73 is here assigned to the aircraft 5 and represents in particular a so-called aircraft computer.

In the area of the control and evaluation device 73, the values determined by corresponding sensor devices 36 and 63 are compared with one another in a method described in more detail in the following, wherein it is determined by the method performed by the control and evaluation device 73 whether a fuel leak is present in the area of the fuel system 1. If a fuel leak is detected, a signal is transmitted by the control and evaluation device 73 to a cockpit 74 of the aircraft 5.

The method in accordance with the invention is described in the present invention for an aircraft 5 having two engines 3, 71, but can also be used in principle for aircraft with several engines, in particular three or four engines. The method in accordance with the invention has in the present case nine method steps 75 to 91, where a fuel leak of the fuel system 1 is detected when all the conditions to be checked in the method steps described in more detail below are met over a stipulated period of, for example, 30 seconds. If a condition to be checked is not met, no fuel leak is detected by the control and evaluation device 73.

In a first method step 75, the control and evaluation device 73 compares the values of the sensor devices 36 of the two engines 3, 71 and checks whether a divergence between the values is greater than a threshold value or limit value which is stored in the control and evaluation device 73 and corresponds, here, to a temperature difference of 17° C.

As part of a second method step 77, the control and evaluation device 73 compares the values from the sensor devices 63 of the two engines 3, 71 and evaluates whether the divergence between the temperature values is greater than a threshold value or limit value stored for that purpose in the control and evaluation device 73. This threshold value corresponds here to a difference of 15° C. between the oil temperature values in the oil circuits 11 of the engines 3, 71.

The control and evaluation device 73 checks in the third method step 79 whether a constant operating state applies for both engines 3, 71 over a period of in this case ten minutes. A constant operating state of the two engines 3, 71 is detected when high-pressure shaft speeds of the two engines 3, 71 diverge from one another by less than 2%.

As part of a fourth method step 81, it is checked whether for both engines 3, 71 a high-pressure shaft speed is greater than 55% of a maximum high-pressure shaft speed. This method step 81 prevents erroneous detection of a fuel leak for example during take-off of the aircraft 5.

The fifth method step 83 is relevant for the case where fuel is conveyed via the valve device 33 back into the tank device 7, since this influences a temperature determined by the sensor devices 36, 63. It is checked here whether over a period of at least ten minutes the same fuel return conditions apply for both engines 3, 71, i.e. a fuel return is not performed in either engine 3, 71 or is performed to the same extent over the specified period.

Since a fuel leak can be erroneously detected when fuel temperatures in the tank devices 7 of engines 3, 71 diverge too widely, it is checked in a sixth method step 85 whether a divergence of the temperature values measured by the further temperature sensor devices is less than 10° C.

In the seventh method step 87, the control and evaluation device 73 checks whether the sensor devices 36, 63 of both engines 3, 71 are operating without error.

To prevent erroneous detection of a fuel leak, for example in the event of a failure of bearing devices 45, due to high oil temperatures and heavy vibrations in the area of the engines 3, 71 occurring as a result, the control and evaluation device 73 in the eighth method step 89 checks whether the temperature values of the respective oil circuit 11 transmitted by the sensor devices 63 are lower than a respective limit value stored in the control and evaluation device 73. In a ninth method step 91, a check is made accordingly as to whether vibrations of the respective engine 3, 71 are lower than a limit value predefined for them.

A fuel leak is detected with the method in accordance with the invention in the present case only when all the aforementioned method steps 75 to 91 are checked positively over a period of 30 seconds. If even a single condition in one of the method steps 75 to 91 is not met, no report of a fuel leak is made to the cockpit 74 regardless of the test results from the other method steps 75 to 91. In principle, the method steps 75 to 91 can be performed in any required sequence.

In an alternative embodiment of a method in accordance with the invention, values determined by the sensor devices 38, 39, 65 can also be used to detect a fuel leak additionally or alternatively to the values determined by the sensor devices 36, 63.

LIST OF REFERENCE NUMERALS

1 Fuel system
3 Engine
5 Aircraft
7 Tank device
9 Low-pressure pump
10 Pump device
11 Oil circuit 13 Cooling device
15 High-pressure pump
17 Fuel metering device
19 Flow measuring device
21 Distributing unit
23 Fuel injection nozzle
25 Filter device
27 Fuel metering valve device
29 Valve device
31 Valve device
33 Valve device
35 Cooler
36 Temperature sensor device
37 Filter
38 Pressure sensor device
39 Pressure sensor device
41 Tank
43 Pump device
45 Bearing device
47 Bearing chamber
49 Bearing chamber
51 Bearing device
53 Drive shaft
55 Accessory gearbox
57 Scavenge pump
59 Line
61 Oil separator
63 Temperature sensor device
65 Pressure sensor device
67 Scavenge line
71 Engine
73 Control and evaluation device
74 Cockpit
75 First method step
77 Second method step
79 Third method step
81 Fourth method step
83 Fifth method step
85 Sixth method step
87 Seventh method step
89 Eighth method step
91 Ninth method step

What is claimed is:

1. A method for detecting a fuel leak in a fuel system of an aircraft, comprising:
providing an aircraft including a control and evaluation device and at least a first engine and a second engine, each assigned a tank device and at least one sensor device connected to the control and evaluation device,
determining from each at least one sensor device, values for each of the first engine and the second engine from a set of parameters including both:
a temperature of a fuel supplied to the one of the first engine and the second engine;
a temperature of an oil of an oil circuit assigned to the one of the first engine and the second engine, for cooling of which the fuel is used as a coolant;
detecting a fuel leak in a range of 350 to 3100 pounds per hour by comparing corresponding values from the set of parameters for the first engine and the second engine using the control and evaluation device, and determining if there is a divergence in any of the compared corresponding values that exceeds a respective predetermined threshold value;
issuing a fuel leak signal if the divergence in any of the compared corresponding values exceeds the predetermined threshold value and the control and evaluation device determines no error message is detected from a sensor device whose values are used to detect the fuel leak.

2. The method in accordance with claim 1, and further comprising comparing, using the control and evaluation device, at least two corresponding values from the set of parameters, and issuing the fuel leak signal if the divergence of each of the at least two corresponding values exceeds the respective predetermined threshold value.

3. The method in accordance with claim 1, and further comprising issuing the fuel leak signal if the divergence in any of the compared corresponding values exceeds the respective predetermined threshold value for a predefined time period.

4. The method in accordance with claim 1, wherein, when comparing the temperature values of the fuel supplied to the first and second engines, the respective predetermined threshold value corresponds to a temperature difference greater than 10° C.

5. The method in accordance with claim 1, wherein, when comparing the temperature values of the oil of the oil circuits assigned to the first and second engines, the respective predetermined threshold value corresponds to a temperature difference greater than 10° C.

6. The method in accordance with claim 1, and further comprising issuing the fuel leak signal if the divergence in any of the compared corresponding values exceeds the respective predetermined threshold value and the control and evaluation device detects a constant operating state of the first and second engines.

7. The method in accordance with claim 1, and further comprising issuing the fuel leak signal if the divergence in any of the compared corresponding values exceeds the respective predetermined threshold value and the control and evaluation device detects a return of fuel into the respective tank device that is approximately equal for both the first and second engines.

8. The method in accordance with claim 1, and further comprising issuing the fuel leak signal if the divergence in any of the compared corresponding values exceeds the respective predetermined threshold value and the control and evaluation device determines a return of fuel into the respective tank device in both the first and second engines is error-free.

9. The method in accordance with claim 1, and further comprising issuing the fuel leak signal if the divergence in any of the compared corresponding values exceeds the predetermined threshold value and the control and evaluation device determines that a temperature in the tank device of the first engine diverges from a temperature in the tank device of the second engine by less than 20° C.

10. The method in accordance with claim 1, and further comprising issuing the fuel leak signal if the divergence in any of the compared corresponding values exceeds the respective predetermined threshold value and the control and evaluation device determines when values for the temperature of the oil in the oil circuit in both first and second engines are lower than a predefined limit value.

11. The method in accordance with claim 1, and further comprising issuing the fuel leak signal if the divergence in any of the compared corresponding values exceeds the respective predetermined threshold value and the control and evaluation device determines that vibrations of both the first and second engines are lower than a predefined limit value.

12. The method in accordance with claim 1, wherein the respective at least one sensor device determines the temperature of the fuel supplied to the one of the first engine and the second engine in an area of a cooling device for cooling the oil.

13. The method in accordance with claim 1,
wherein the determining from each at least one sensor device, values for each of the first engine and the second engine from a set of parameters includes:
a pressure difference between predefined points in the fuel system; and
wherein the respective sensor device determines the pressure difference between predefined points in the fuel system from a pressure prevailing upstream of a filter device and from a pressure prevailing downstream of the filter device, said filter device being assigned to a cooling device for cooling the oil.

14. The method in accordance with claim 1, wherein the respective sensor device determines the temperature of the oil of the oil circuit assigned to the one of the first engine and the second engine in a line area in which oil is passed directly back to an oil tank device.

15. The method in accordance with claim 1, wherein, when comparing the temperature values of the fuel supplied to the first and second engines, the respective predetermined threshold value corresponds to a temperature difference of between 15° C. and 30° C.

16. The method in accordance with claim 1, wherein, when comparing the temperature values of the oil of the oil circuits assigned to the first and second engines, the respective predetermined threshold value corresponds to a temperature difference of between 15° C. and 30° C.

17. The method in accordance with claim 1, and further comprising issuing the fuel leak signal if the divergence in any of the compared corresponding values exceeds the respective predetermined threshold value and the control and evaluation device determines that a temperature in the tank device of the first engine diverges from a temperature in the tank device of the second engine by less than 10° C.

* * * * *